Nov. 4, 1941.  L. DE FLOREZ ET AL  2,261,343
PYROMETRIC DEVICE
Filed June 14, 1938  2 Sheets-Sheet 1
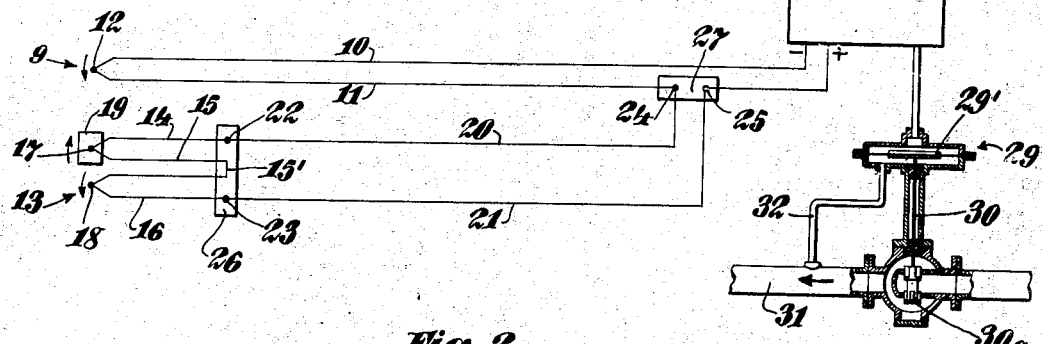
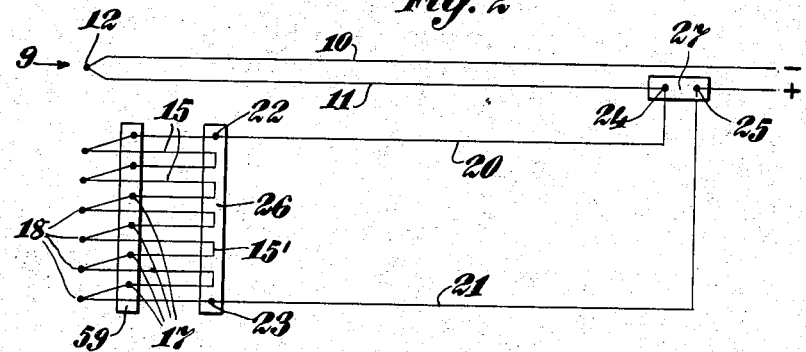
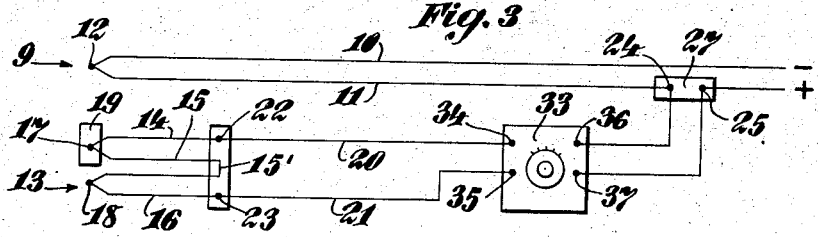
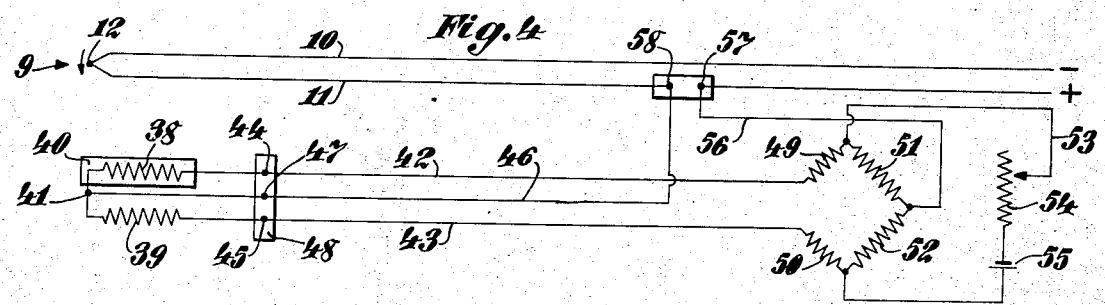
INVENTORS:
Luis de Florez and
Emmon Bach,
BY Hoguet, Neary & Campbell,
ATTORNEYS Patented Nov. 4, 1941

2,261,343

UNITED STATES PATENT OFFICE 2,261,343

PYROMETRIC DEVICE

Luis de Florez, Pomfret, Conn., and Emmon Bach, Yonkers, N. Y.

Application June 14, 1938, Serial No. 213,594

10 Claims. (Cl. 236—14)

This invention relates to devices for controlling temperature, and more particularly to apparatus for maintaining the temperature in a given temperature zone at a constant value by adjusting the temperature in a second related temperature zone.

Temperature disturbances in industrial processes, such as are experienced for example in the control of the outlet temperature of a tubular oil still, can usually be traced to one of two main causes. The first of these is the change in the temperature of the furnace which produces heat for the distilling or cracking process, such as might result from a change in the calorific value of the fuel used. Changes of this character precede changes in the outlet temperature by a given period of time, depending on the thermal lag and heat transfer characteristics of the system, and if noted in time, can be corrected by adjusting the fuel supply before any change in the outlet temperature occurs.

A second frequent cause for change is that the outlet temperature of the still may also vary with the operating load, in which case changes in the control temperature will occur even though the temperature of the furnace remains at a constant value. In this case the adjustment of the furnace temperature, in order to restore the outlet temperature to the desired value, must be very carefully made, since the huge mass of brick and steel of which the furnace is constructed must be very slowly heated or cooled in order to prevent unequal expansion and possible damage resulting therefrom.

In a high inertia thermal system of this character, regulatory fuel changes may be made in response to the deviation of the temperature from the control setting. It has been found, however, that changes made in this manner tend to induce an undesirable cyclic swinging, or "hunting," as it is called, of the temperature about the control setting, due to the time lag existing between fuel change and change of the control temperature.

Devices of the character disclosed in prior Patents Nos. 1,837,853 and 2,054,120 proportion the fuel change to the net effect of both the change in temperature and the rate at which the change takes place, so that by their use, disturbances in the outlet temperature can be quickly corrected without "hunting."

With all of these devices, however, no regulatory action can be initiated to compensate for a change in the calorific value of the fuel until the latter change is reflected as a change in the outlet temperature.

The principal object of the present invention, accordingly, is to provide an apparatus for anticipating changes in the control temperature before they occur, in a system where changes in the control temperature may be preceded by changes in the temperature of a related temperature zone.

Another object of the invention is to provide an apparatus of the above character which is adapted to correct changes in the temperature of the related temperature zone before any change in the control temperature has taken place.

A further object of the invention is to provide an apparatus of the above character which is adapted to adjust the temperature of the related temperature zone in order to maintain a constant control temperature, where changes in the control temperature are the result of factors other than changes in the related temperature zone.

In a preferred embodiment of the invention, an electrical temperature responsive element is placed in the zone whose temperature it is desired to control, and a second element responsive to the rate of change of temperature is placed at some selected point in a related temperature zone in which changes in temperature occur in advance of those at the control point. Both the temperature responsive element and the rate of change responsive element are connected in series and the outlet of the series circuit is made to actuate a controller of a well known type which supplies air under pressure to a fuel valve and thus governs the amount of fuel supplied to a heating element in the related temperature zone.

The rate of change responsive element may consist of a pair of substantially identical electrical temperature responsive devices which are connected so that their electrical effects are opposite with respect to one another. Thus, when both devices are at the same temperature, the net effect of the two in series is zero. One of these devices may be directly exposed to the heat at the related temperature zone, and the other may be lagged in the manner disclosed in our prior Patent No. 2,054,120, so that it does not immediately respond to changes in the temperature of the related zone. Thus, for a given change in the temperature of the related temperature zone, one device of the rate of change element will respond directly, and the other will respond more slowly, depending on the heat transfer characteristics of the lagging material used. Under these conditions, a temperature difference exists between the two devices, and the resulting E. M. F. is of a magnitude and sign corresponding to the rate and direction of temperature change of the zone in which the rate responsive element is immersed. If now no further change in temperature occurs, the lagged device will increase its response until it too has reached the normal steady state temperature of its surroundings. Now with both devices of the rate of change responsive element at the same temperature, the net effect is again zero.

The operation of this novel temperature responsive apparatus may be better understood from the following detailed description taken in conjunction with the accompanying drawings, in which:

Figure 1 is a schematic diagram of a temperature control apparatus constructed in accordance with this invention;

Figure 2 is a schematic diagram similar to Figure 1 in which a plurality of rate of change responsive elements are used to amplify the rate of change response;

Figure 3 is a schematic diagram illustrating a modified means for amplifying the rate of change response;

Figure 4 is a schematic diagram of a modification of the invention in which resistance thermometers are used in place of thermocouples.

Figure 5:
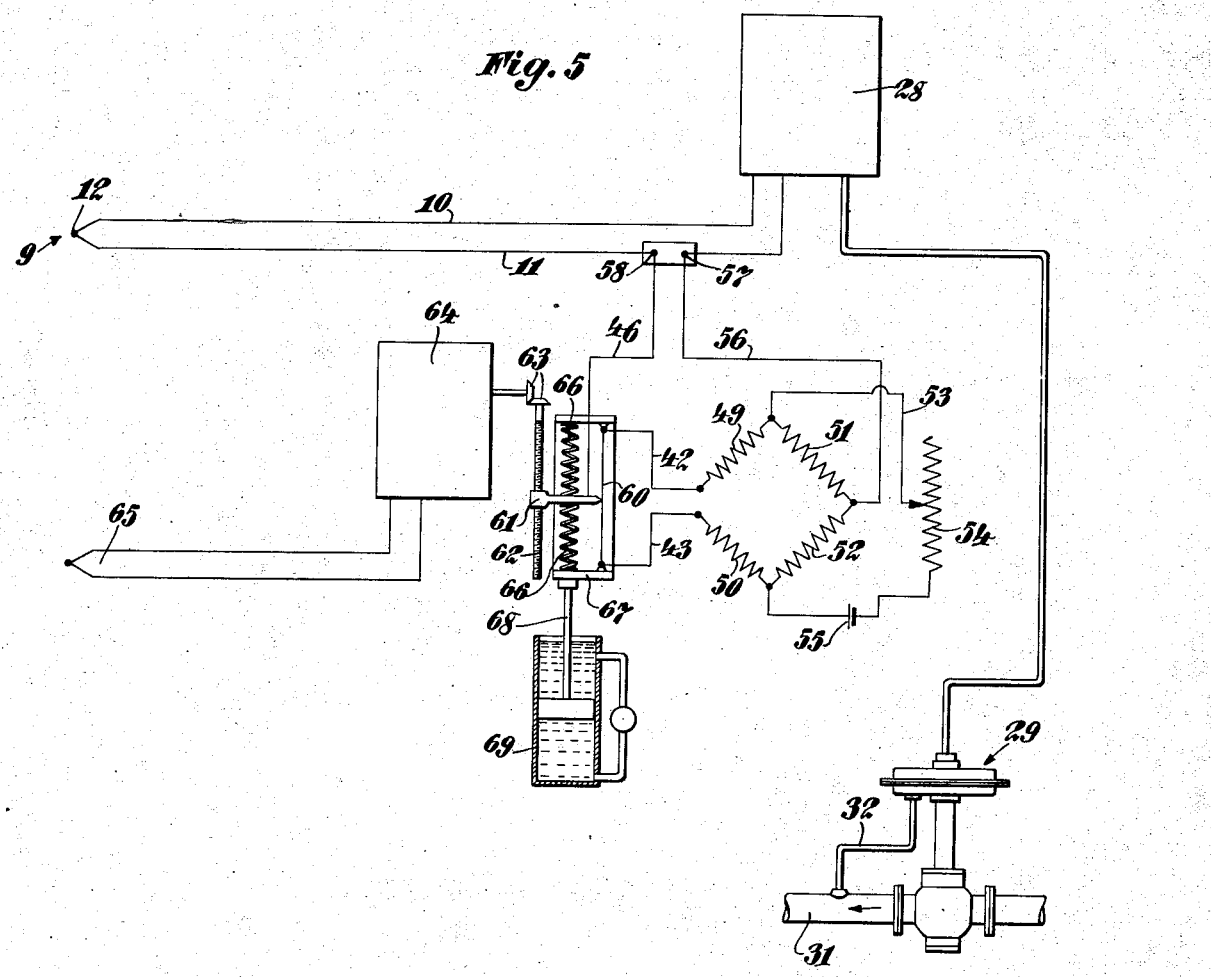
Figure 5 is a schematic diagram of a further modification of the embodiment of the invention shown in Figure 4.

Referring to Figure 1, an element responsive to the control temperature is shown at 9 and it comprises a thermocouple formed of two dissimilar metals, such as for example a wire of constantan 10 and a wire of iron 11 which are joined together at one end to form a hot junction 12. It will be obvious that numerous combinations of dissimilar materials may be used, and the invention is not intended to be limited to the specific examples shown. Connected in series with the control temperature responsive element 9 is an element 13, responsive to the rate of change of temperature in a second temperature zone related to the control temperature, and in which changes of temperature may precede those at the control point.

The rate of change responsive element may comprise a pair of oppositely connected thermocouples formed from the dissimilar wires 14, 15 and 16, whose extremities are joined to form the hot junctions 17 and 18. Thus the wire 14 and the wire 15 up to the portion 15' form one couple having the hot junction 17. The remainder of the wire 15 beyond the portion 15' together with the wire 16 forms a second couple having the hot junction 18 which is connected in series with the first couple in such fashion that their E. M. F's are opposed. The wires 14 and 16 may be of chromel and wire 15 may be of constantan, although obviously other combinations may be used, provided only that wires 14 and 16 are of the same metal. The junction 17 is provided with lagging 19 such as is disclosed in our prior Patent No. 2,054,120, and which may be a large mass of metal or any other suitable lagging material.

The rate responsive element is connected through the wires 14 and 16, respectively, with wires 20 and 21, which may be of copper, in series with the control temperature responsive element. These connections form a number of junctions 22, 23 and 24, 25, which are enclosed in the junction boxes 26 and 27, respectively, in order to maintain the respective sets of junctions at the same temperature so that they will not introduce extraneous E. M. F's into the system.

The open end of the series circuit is connected to a controller 28 at which point the cold junction (not shown) may be located. This controller is of a well known type, in which the E. M. F. from the thermocouple circuit may be used to control the passage of air to a fuel valve 29, but the form of controller is no part of the present invention. The fuel valve 29 is provided with a flexible diaphragm 29' to which a valve stem 30 is connected. The valve 30a is opened by increasing the air pressure above the flexible member 29', whose movement is balanced by the after pressure of the fuel in the feed pipe 31, which is connected to the underside of the flexible member 29' through a pipe 32. The pipe 32 is connected to the pipe 31 at a point in the feed line sufficiently removed from the valve to minimize error due to turbulence caused by the passage of the fluid through the valve in the direction shown by the arrow.

Since under static conditions the E. M. F's of the two opposed couples are equal and oppositely directed, the controller 28 need be calibrated for the control temperature couple 9 only, and the metals used in the rate of change responsive element 13 may obviously be different from those in the couple 9 if desired.

In a specific application of the temperature controlling apparatus, the hot junction 12 of the control temperature responsive element 9 may be placed in a zone whose temperature it is desired to control, such as for example, the oil stream at the outlet of a tubular oil still, and the hot junctions 17 and 18 of the rate responsive element 13 may be placed at a selected point in a related temperature zone, such, as, for example, the furnace which provides heat for the distilling coils in the still. As has been mentioned above, a definite time lag exists between temperature changes in the furnace and temperature changes at the outlet, which depends on the heat transfer characteristics of the system. In accordance with the present invention, the lagging 19 may be so designed that the lag in the temperature of the hot junction 17 with respect to the hot junction 18, is essentially the same as the lag between the control temperature as measured by the control temperature responsive element 9, and the furnace temperature at the rate of change responsive element 13.

Assuming now that steady state conditions exist, an E. M. F. exists at the junction 12 which is directed as indicated by the arrow, and similar E. M. F's exist at the junctions 17 and 18, respectively, which are directed as indicated by the arrows shown in Figure 1. It will be noted that the E. M. F's at the junctions 17 and 18 are opposite in sense, and since the two couples of which these junctions are a part are made of the same metals, for a given steady state hot junction temperature, these E. M. F's are equal in magnitude, so that the total response is zero. It will also be observed that the direction of the E. M. F. at the junction 12 is the same as that of the E. M. F. at the junction 18, but is opposite in direction to the E. M. F. at the junction 17. Thus, the net impulse, or electrical effect, of all junctions is the algebraic sum of the impulse due to deviation of the control temperature and that due to the rate of temperature change of the related temperature zone.

Let us assume now that due to a change in the calorific value of the fuel supplied to the furnace through the pipe 31, the furnace temperature increases. This temperature increase will be directly followed by the junction 18, but will not be instantaneously followed by the junction 17 due to the lagging 19 in which it is embedded. There will therefore be a resultant E. M. F. in the circuit which will be directed as shown by the arrow at the junction 18, and which will actuate the controller 28, decreasing the air pressure above the flexible member 29' and thus reducing the quantity of fuel supplied to the furnace. Thus, the change in temperature of the furnace is instantaneously corrected before it can affect the temperature of the oil at the outlet, which is measured by the control temperature responsive element 9.

If now, due perhaps to a change in load, the control temperature at the outlet of the still decreases, the E. M. F. of the control temperature responsive element 9 will drop, thus actuating the controller 28 and increasing the pressure of the air supplied above the flexible member 29' and opening the fuel valve to increase the supply of fuel fed to the furnace. As a result of the increase in fuel supplied, the temperature of the furnace begins to increase and the temperature of the hot junction 18 of the rate of change responsive element 13 increases accordingly. The lagging 19 around the hot junction 17 prevents it from following the increasing temperature of the furnace so that again a resultant E. M. F. exists in the circuit of the rate of change responsive element 13, which acts in the direction of the arrow at the junction 18.

It will be noted that the direction of this rate of change E. M. F. is in the same direction as the E. M. F. generated at the control temperature responsive element 9 at the still outlet. By a suitable choice of thermocouple wires, the increase in E. M. F. from the rate of change responsive device may be made exactly equal to the decrease in the E. M. F. of the control temperature responsive device, so that the total E. M. F. in the circuit is restored to the normal value.

Meanwhile, the temperature of the lagged junction 17 slowly increases, and since its time of lag has been chosen to be the same as the time of lag in the system, the temperature of the junction 17 increases substantially in direct proportion to the increase in temperature at the outlet. Under these conditions, the net impulse from the rate responsive element tends to cancel the impulse due to the drop in outlet temperature, and the controller is restrained from effecting too rapid a change in fuel.

It will be evident, therefore, that with the temperature control apparatus of this invention, changes in fuel value are immediately compensated for and the fuel supply to the furnace adjusted before any change in the outlet temperature occurs. Thus, it is now possible to maintain the outlet temperature constant and independent of variations in the calorific value of the fuel. Furthermore, where changes in the outlet temperature occur due to changes in the load, the furnace temperature may be adjusted at a rate within its safe limits until the desired outlet temperature is restored.

In the modification shown in Figure 2, the rate of change responsive device consists of a plurality of unlagged hot junctions 18 and an equal number of junctions 17 which are provided with lagging material 59, and all of which are connected in series to provide a rate of change E. M. F of large magnitude.

The same result may be obtained as shown in Figure 3 by inserting an amplifier 33 in the circuit of the rate of change responsive element shown in Figure 1. Obviously, by adjusting the gain of amplifier 33, the impulse of the rate of change responsive element may be given any desired value. The junctions 34, 35 and 36, 37, respectively, should be kept at the same temperature in order to prevent extraneous E. M. F.'s from appearing in the circuit. Since extraneous E. M. F.'s of this character will give incorrect E. M. F. values, it is important that this precaution be observed.

If desired, temperature responsive elements other than thermocouples may be used, as is indicated in the modification shown in Figure 4, in which resistance elements are used in conjunction with a resistance bridge as the rate of change responsive element. In this modification, as in the others, the thermocouple 9 is located in the temperature zone to be controlled, such as in the outlet of an oil still. At a selected point in the furnace, a pair of substantially electrically identical resistance elements 38 and 39 are inserted, the element 38 being provided with lagging 40 which is similar in character to the lagging 19 provided for the junction 17. The elements 38 and 39 are connected at one end to a common point 41 which forms one of the vertices of a resistance bridge, and at the other end to the wires 42 and 43, respectively, forming the junctions 44 and 45, respectively. The common point 41 is also connected to a wire 46 forming the junction 47.

The junctions 44, 45, and 47 are enclosed in a suitable junction box 48 in which they may be kept at the same temperature in order to prevent thermoelectric E. M. F's from acting in the bridge circuit. The wires 42 and 43 are connected to a resistance bridge which is formed by resistors 49, 38, 39 and 50 in one arm and resistors 51 and 52 in the other. The common point of the resistors 49 and 51 is connected through a wire 53, a variable resistor 54 and a source of voltage 55 to the common point of the resistors 50 and 52. By means of resistor 54 the voltage applied across the bridge may be adjusted to give the rate of change of temperature impulse any desired value. The wire 11 of the control temperature responsive element 9 is broken and is connected at the junction 57 through a wire 56 to the common point of the resistors 51 and 52. The wire 46 is connected to the other end of the wire 11 forming a junction 58, so that the voltage between the common point of the resistors 51 and 52 and the point 41 is connected in series with the E. M. F. of the control temperature responsive element 9.

In operation, and assuming that steady state conditions exist, the resistance elements 38 and 39 are at the same temperature and therefore have the same resistance value. Under these conditions, the resistance bridge is balanced and no voltage exists between the point 41 and the common point of the resistors 51 and 52. If, however, the furnace temperature now increases, the unlagged element 39 will also increase in temperature and its resistance value will increase accordingly. The element 38 being lagged, however, will not respond instantaneously to the change in temperature so that its resistance value will remain essentially unchanged. This change in resistance will unbalance the bridge and a voltage will exist across the common point of the resistors 51 and 52 and the point 41 which acts in the same direction as the E. M. F. at the junction 12 of the control temperature responsive element 9. This increase in the E. M. F. in the circuit will act to decrease the fuel supplied to the furnace in the manner described above, thus reducing the furnace temperature to the normal value. The resistance element 39 therefore plays the same part as the thermocouple which includes the hot junction 18 shown in Figures 1, 2 and 3.

In the case where the control temperature decreases, for example, due to a change in load, the controller will again be actuated as described above to increase the supply of fuel to the furnace. The increased fuel supply will cause the furnace temperature to rise, thus again changing the resistance of the element 39 and inserting an E. M. F. in the control circuit which will substantially balance the decrease in the E. M. F. at the junction 12 due to the drop in temperature.

As in the case of the couple 17, the lagging 40 is so designed that the time of lag between the element 39 and the element 38 is substantially the same as the time of lag between the control temperature and the furnace temperature. Hence, as the temperature of the element 38 slowly increases, its resistance value will also increase, thus restoring the resistance bridge to its normal balanced condition. If the outlet temperature measured by the junction 12 increases substantially at the same rate as the temperature of the element 38 is increasing, the total E. M. F. in the circuit remains essentially constant and no further change in fuel supply is made.

The same results may be accomplished by means of the apparatus shown in Figure 5 in which the resistance elements 38 and 39 in the resistance bridge are replaced by a slide wire resistance 60, which is connected at one extremity through the wire 42 to the resistor 49 and at the other extremity through the wire 43 to the resistor 50. The wire 46 is connected to a contact member 61 which moves on a lead screw 62, by means of which its point of contact with the slide wire 60 may be adjusted. The lead screw 62 is driven through the gearing 63 by a controller 64 which may be, for example, the automatic recording mechanism usually associated with temperature recording equipment, and which is actuated by means of a thermocouple 65 located in the related temperature zone.

In this modification a change in the temperature of the related temperature zone gives rise to a thermoelectric impulse in the thermocouple 65 which actuates the controller 64. The controller 64 drives the lead screw 62 through the gearing 63, thus moving the contact 61 from its normal balanced position on the slide wire 60 to a new position which unbalances the resistance bridge. The movement of the contact 61 is transmitted through the springs 66 to a slide member 67 to which the slide wire 60 is secured. Secured to the lower end of the slide 67 is the shaft 68 of a dash pot 69, which serves to retard the movement of the slide 67. Thus, the contact 61 in response to changes in the temperature of the related temperature zone, changes its position along the slide wire 60 and unbalances the resistance bridge, providing an electric impulse which actuates the controller 28 and changes the fuel supply to the furnace in the manner described above.

Although the movement of the contact 61 is transmitted immediately to the slide 67 through the springs 66, the action of the dash pot 69 retards the movement of the slide 67 so that it moves in the same direction as the contact 61 but at a slower rate. It will be evident that when the slide 67 has moved the same distance as the contact 61 in the same direction, the bridge will be restored to its normal balanced position and no further change in fuel will be made.

In view of the fact that changes in the furnace gas temperature precede both furnace and outlet temperature changes, the rate responsive element may be made responsive to the furnace gas temperature, in which case it will be possible to detect and arrest potential disturbances in the control temperature at the earliest possible moment. Furthermore, where very accurate control is desired a rate responsive element may be placed at the inlet, or at any point between the inlet and the outlet, of the distilling and cracking coil to anticipate changes in outlet temperature resulting from changes in inlet temperature. It is to be understood that all such modifications are within the scope of the present invention.

It will be understood from the foregoing that the invention provides an improved apparatus for controlling temperatures within very close limits. In the embodiments shown, for example, a change of the furnace temperature is noted almost as soon as it occurs, and the fuel supply adjusted before any change in the control temperature takes place. It thus provides an improved apparatus for detecting potential disturbances in the control temperature and initiating regulatory action before the changes occur, resulting in improved operation in those processes in which it may be used.

It is evident that the invention may be used in other processes than the control of the tubular oil still described above, and it is to be understood that all such uses are considered as being within the scope of the present invention. While a specific embodiment has been described above, it is susceptible of numerous changes in form and detail within the scope of the present invention and the latter is not intended in any way to be limited thereby, except as defined in the following claims.

We claim:

1. In a system in which changes in a control temperature are to be regulated by temperature changes in a related temperature zone where heat is introduced into the system, a pyrometric circuit comprising means responsive to the control temperature for impressing an E. M. F. on said circuit, means disposed in said related temperature zone and responsive to the rate of change of temperature therein for adding a second E. M. F. to the said first E. M. F., and means responsive to the resultant E. M. F. in said circuit.

2. In a system in which changes in a control temperature are to be regulated by temperature changes in a related temperature zone where heat is introduced into the system, a temperature control device comprising electrical means responsive to the control temperature, electrical means disposed in said related temperature zone and responsive to the rate of change of temperature therein, both said electrical means being connected in series to provide a resultant electromotive force, means to adjust the heat supplied to the said related temperature zone, and means responsive to the said electromotive force for actuating the said heat adjusting means to maintain the control temperature at a constant value.

3. In a system in which changes in a control temperature are to be regulated by temperature changes in a related temperature zone where heat is introduced into the system, a temperature control device comprising a thermocouple having a hot junction responsive to the control temperature, a second thermocouple having at least two hot junctions disposed in said related temperature zone and responsive to the temperature therein, and means for lagging one of said hot junctions to produce a time lag in response between the two said hot junctions, both said couples being connected in series to provide an electromotive force which is a function of the control temperature, and the rate of change of temperature in the related temperature zone.

4. In a system in which changes in a control temperature are to be controlled by temperature changes in a related temperature zone where heat is introduced into the system, a temperature control device comprising a thermocouple having a hot junction responsive to the control temperature, a second thermocouple having at least two hot junctions disposed in said related temperature zone and responsive to the temperature therein, and means for lagging one of said hot junctions to produce a time lag in response between the two said hot junctions substantially equal in magnitude to the time lag between the control temperature and the temperature of the related temperature zone, both said couples being connected in series to provide an electromotive force which is a function of the control temperature, and the rate of change of temperature in the related temperature zone.

5. In a system in which changes in a control temperature are to be regulated by temperature changes in a related temperature zone where heat is introduced into the system, a temperature control device comprising a pair of series connected thermocouples, one of said couples having a hot junction responsive to the control temperature, the other of said couples having two wires of similar metal connected to a third wire of different metal forming two hot junctions disposed in said related temperature zone and responsive to the temperature therein, means for lagging one of said last named hot junctions to provide a lag in response between the said junctions, whereby the total electromotive force of the series connected couples will be a function of the control temperature, and the rate of change of temperature of the related temperature zone.

6. In a system in which changes in a control temperature are to be regulated by temperature changes in a related temperature zone where heat is introduced into the system, a temperature control device comprising three series connected thermocouples, one of said couples having a hot junction responsive to the control temperature, the other two couples each having a hot junction disposed in said related temperature zone and responsive to the temperature therein, and being oppositely connected so that their electromotive forces are opposed, and means for lagging the hot junction of one of the said last named couples to produce a time lag in response between it and said other couple, the electromotive force of the lagged couple being oppositely directed to the electromotive force of the control temperature couple, whereby the total electromotive force of the series connected couples is a function of the control temperature, and the rate of change of temperature in the related temperature zone.

7. In a system in which changes in a control temperature are to be regulated by temperature changes in a related temperature zone where heat is introduced into the system, a temperature control device comprising electrical means responsive to the control temperature, electrical means disposed in said related temperature zone and responsive to the rate of change of temperature therein, both said electrical means being connected in series to provide an electromotive force which is a function of the control temperature, and the rate of change of temperature in the related temperature zone, and means for amplifying the response of the said rate of change means.

8. In a system in which changes in a control temperature are to be regulated by temperature changes in a related temperature zone where heat is introduced into the system, a temperature control device comprising a thermocouple having a hot junction responsive to the control temperature, a plurality of thermocouples each having two hot junctions disposed in said related temperature zone and responsive to the temperature therein, one of said junctions in each couple being lagged to provide a lag in response between the two junctions of each couple, all of said couples being connected in series to provide a resultant electromotive force which is a function of the control temperature, and the rate of change of temperature in the related temperature zone.

9. In a system in which changes in a control temperature are to be regulated by temperature changes in a related temperature zone, a temperature control device comprising a resistance bridge, a source of voltage for the said bridge, a thermocouple having a hot junction responsive to the control temperature, the said thermocouple being connected in a circuit across one diagonal of the bridge, and means responsive to the rate of change of temperature in the related temperature zone for unbalancing the bridge to provide a resultant electromotive force in said circuit which is a function of the control temperature, and the rate of change of temperature in the related temperature zone.

10. In a system in which changes in a control temperature are to be regulated by temperature changes in a related temperature zone, a temperature control device comprising a resistance bridge, a source of voltage for the said bridge, a thermocouple having a hot junction responsive to the control temperature, the said thermocouple being connected in a circuit across one diagonal of the bridge, means for unbalancing the bridge, a controller for the said unbalancing means, a thermocouple having a hot junction responsive to the temperature of the related temperature zone for actuating the said controller, means for restoring the bridge to balance, and means for retarding the said balance restoring means, whereby the resultant electromotive force in said circuit is a function of the control temperature, and the rate of change of temperature in the related temperature zone.

LUIS DE FLOREZ.
EMMON BACH.